Dec. 29, 1931.                J. C. BERGNER                1,839,180
                          ALIMENT FORMING DEVICE
                           Filed April 5, 1930
FIG. I.
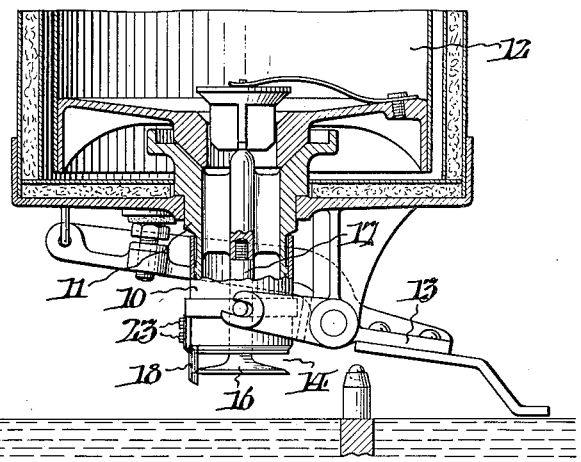
FIG. II.
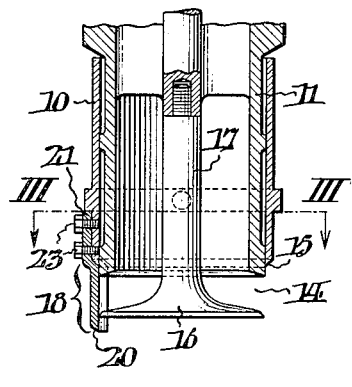
FIG. IV.
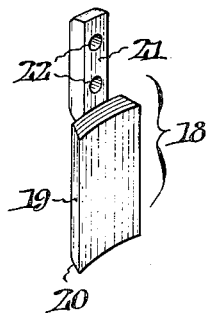
FIG. V.
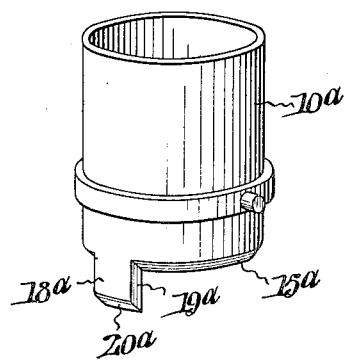
FIG. III.
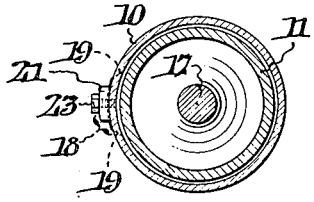
FIG. VII.
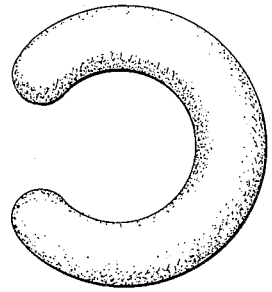
FIG. VI.
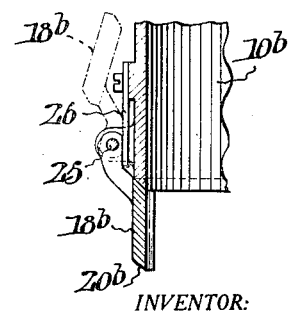
WITNESSES
Hubert Fuchs
John A. Weidler
INVENTOR:
John C. Bergner,
BY Fraley Paul
ATTORNEYS.

Patented Dec. 29, 1931

1,839,180

UNITED STATES PATENT OFFICE

JOHN C. BERGNER, OF LANSDOWNE, PENNSYLVANIA, ASSIGNOR TO DOUGHNUT MACHINE CORPORATION, OF NEW YORK, N. Y., A CORPORATION OF NEW YORK

ALIMENT FORMING DEVICE

Application filed April 5, 1930. Serial No. 441,845.

This invention relates to devices for forming alimentary products, and has more particular reference to doughnut forming devices of the type disclosed in U. S. Patent No. 1,492,542, granted to me on April 29, 1924.

In connection with devices of the specific kind referred to, I aim to enable formation of doughnuts of crescent configuration in the same manner and with the same precision and regularity as described in the patent with regard to production of annular formations.

How the indicated desideratum may be readily attained in practise will be manifest from the detailed description which follows in co-ordination with the attached drawings, whereof Fig. I is a fragmentary sectional view of an aliment forming device corresponding to Fig. VI of the patent, supra, and embodying my present improvement.

Fig. II is a fragmentary axial sectional view drawn to a somewhat larger scale than in Fig. I showing the dough hopper outlet of the forming device and the die mechanism associated with it.

Fig. III is a cross sectional view taken as indicated by the arrows III—III in Fig. II.

Fig. IV is a perspective view of a supplemental element featured in the embodiment of my invention shown in Figs. I, II and III.

Fig. V is a perspective view showing an alternative embodiment of my invention.

Fig. VI is a detail sectional view generally like Fig. II showing still another modification; and Fig. VII shows a dough formation of crescent configuration such as may be produced with the forming device of my invention.

The operation of the aliment forming device illustrated in Figs. I and II is precisely the same as described in my patent above identified, that is to say: A sleeve 10 slidable on the tubular axial bottom outlet 11 of the dough magazine or hopper 12, is intermittently operated by a lever 13; and, incident to downward movement, the said sleeve closes an annular die opening 14 at the bottom of the outlet to sever dough previously extruded under air pressure from within the magazine or hopper through the die opening. Also, as in the patent, the severing action takes places between the beveled edge 15 of the sleeve 10 and a cutter disk 16 that occupies a level somewhat below the bottom edge of the outlet and thus defines the die opening, the stem 17 of the disk being fixedly supported from within said outlet.

To predetermine crescent formations such as shown in Fig. VII instead of the usual annular formations, I provide the sleeve 11 with a downward segmental extension which may be either a separate supplemental piece such as shown at 18 in Figs. I–III, or an integral prolongation of the sleeve as indicated at 18a in Fig. V. In either case, the extension or prolongation is rounded to conform with the inside curvature of the sleeve 10 for close sliding fitment with the periphery of the cutting disk 16, and thereby operates as an obstruction to shut off a circumferential portion of the die opening 14. It is to be particularly noted that the side and bottom edges 19, 19a and 20, 20a of the extensions 18, 18a are beveled to facilitate parting of the dough. This obviously insures clean release of the formations by the die mechanism after cutting. In the case of the supplemental extension piece 18 of Figs. I–IV, an upward tongue 21 is provided with openings 22 for securing screws 23 which take into the side of the sleeve 10 as clearly shown in Fig. II.

In the alternate embodiment of my invention illustrated in Fig. VI, the supplemental extension piece 18b has pivotal connection at 25 with the sleeve 10b so that it may be swung upward out of the way to the dot-and-dash line position when formations of annular configuration are to be produced by the device. By means of a leaf spring 26 the extension is yieldingly but firmly held either in its active or retracted positions.

Having thus described my invention, I claim:

1. The combination in an aliment forming device of the character described comprising a dough hopper with a tubular outlet affording an annular die opening, and an intermittently actuated sleeve slidable on the outlet to close the die opening and to sever extrusions of dough; and a segmental extension piece on the sleeve to shut off a circumferential portion of the die opening and thereby to predetermine formations of crescent configuration, said segmental extension piece being retractable for adaptation of the device to produce annular formations when desired.

2. The combination in an aliment forming device of the character described comprising a dough hopper with a tubular outlet affording an annular die opening, and an intermittently actuated sleeve slidable on the outlet to close the die opening and to sever extrusions of dough; of a segmental extension piece on the sleeve to shut off a circumferential portion of the die opening and thereby to predetermine formations of crescent configuration, said extension piece being pivotally attached so that it may be swung to a retracted position for adaptation of the device to produce annular formations when desired.

In testimony whereof, I have hereunto signed my name at Philadelphia, Pennsylvania, this 31st day of March, 1930.

JOHN C. BERGNER.